(12) United States Patent
Mages

(10) Patent No.: US 8,317,228 B2
(45) Date of Patent: Nov. 27, 2012

(54) BELT TENSIONER

(75) Inventor: Mark Mages, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 133 days.

(21) Appl. No.: 12/821,173

(22) Filed: Jun. 23, 2010

(65) Prior Publication Data

US 2011/0012418 A1    Jan. 20, 2011

(30) Foreign Application Priority Data

Jul. 17, 2009   (DE) .......................... 10 2009 033 631

(51) Int. Cl.
*B60R 22/46* (2006.01)
(52) U.S. Cl. ........................................ 280/806; 297/480
(58) Field of Classification Search .................... 60/632, 60/635, 636, 637, 638; 180/268, 270, 271; 280/806, 807; 297/479, 480
See application file for complete search history.

(56) References Cited

U.S. PATENT DOCUMENTS

| | | | |
|---|---|---|---|
| 6,419,271 B1 * | 7/2002 | Yamada et al. | 280/806 |
| 6,485,058 B1 * | 11/2002 | Kohlndorfer et al. | 280/808 |
| 6,527,298 B2 * | 3/2003 | Kopetzky | 280/806 |
| 6,969,088 B2 * | 11/2005 | Wang | 280/802 |
| 7,370,885 B2 * | 5/2008 | Stevens | 280/741 |
| 7,452,003 B2 * | 11/2008 | Bell | 280/806 |
| 2004/0256850 A1 | 12/2004 | Yamaguchi | |
| 2006/0213191 A1 | 9/2006 | Borg et al. | |
| 2009/0045615 A1 * | 2/2009 | Bell | 280/806 |

OTHER PUBLICATIONS

Integral Definition, Merriam-Webster Online Dictionary, available at, http://www.merriam-webster.com/dictionary/integral (last visited Apr. 17, 2012).*

* cited by examiner

*Primary Examiner* — Joseph Rocca
(74) *Attorney, Agent, or Firm* — Tarolli, Sundheim, Covell & Tummino LLP

(57) ABSTRACT

A belt tensioner of a vehicle occupant restraint system, especially a belt buckle tensioner, comprises a coupling member (12) to the vehicle seat belt, a drive unit (18), a flexible tension transmitting means (14) and a deflector (26). The flexible tension transmitting means (14) is connected at least indirectly to the coupling member (12) and is moved via the drive unit (18) in the event of tensioning. The deflector (26) deflects the tension transmitting means (14) in the direction of the coupling member (12). The tension transmitting means (14) is moved along the deflector (26) in the event of tensioning. According to the invention, the drive unit (18) is coupled in terms of drive to the deflector (26) such that the drive unit (18) moves the deflector (26) upon activation and thus displaces the coupling member (12) in the tensioning direction (R).

14 Claims, 2 Drawing Sheets

BELT TENSIONER

FIELD OF THE INVENTION

The invention relates to a belt tensioner of a vehicle occupant restraint system, especially a belt buckle tensioner, comprising a coupling member to the vehicle seat belt, a drive unit, a flexible tension transmitting means and a deflector for the tension transmitting means.

BACKGROUND OF THE INVENTION

Belt tensioners serve for eliminating a belt slack in the case of strong deceleration so that the vehicle occupant can more quickly take part in the overall deceleration of the vehicle. A buckle tensioner includes a flexible tension transmitting means, for instance a steel cable, to which a belt buckle of a seat belt is fastened. The tension transmitting means is mounted to a drive unit and is deflected toward the belt buckle via a deflection fixed to the vehicle. When activating the drive unit, the latter pulls the tension transmitting means through the deflector so that the belt buckle fastened to the tension transmitting means is pulled in the direction of the deflection. The displacement of the belt buckle and thus the pull-in of the belt strap here correspond to the travel of the drive unit. The limited mounting space in a vehicle confines the tensioning distance of the drive unit.

It is the object of the invention to provide a belt tensioner permitting a longer travel of the belt buckle and thus a belt tensioning over a longer distance, a compact construction notwithstanding.

SUMMARY OF THE INVENTION

According to the invention, for this purpose a belt tensioner of a vehicle occupant restraint system is provided, especially a belt buckle tensioner, comprising a coupling member to the vehicle belt, a drive unit, a flexible tension transmitting means and a deflector. The tension transmitting means is connected at least indirectly to the coupling member and, in the event of tensioning, is moved via the drive unit. The deflector deflects the tension transmitting means in the direction of the coupling member. The tension transmitting means is moved, in the event of tensioning, along the deflector. As a consequence, a relative movement occurs between the tension transmitting means and the deflector. The drive unit is coupled to the deflector in terms of drive so that the drive unit moves the deflector upon activation and thus displaces the coupling member in the tensioning direction. Hence the drive unit does not act directly upon the tension transmitting means but upon the deflector and displaces the same along the tension transmitting means. By displacing the deflector along the tension transmitting means the coupling member is moved, as in the case of previous belt tensioners, relative to the deflector in the direction of the deflector. Since, moreover, the deflector and thus the belt buckle is moved by the drive unit along the actuating direction of the drive unit, the total displacement of the belt buckle is increased, because the coupling member is moved in two directions, viz. horizontally in the direction of travel of the deflector and obliquely downwards in its direction of extension. Compared to a belt tensioner of the state of the art, the belt tensioner according to the invention thus offers a larger belt strap pull-in with an equal travel of the drive unit.

In a preferred embodiment, the tension transmitting means has a portion connected to the coupling member and a mounting portion fixed to the vehicle. The drive unit can act upon a component fixed to the vehicle and can displace the deflector relative to the mounting portion of the tension transmitting means.

It is especially advantageous when a guide is provided by which the deflector is supported to be linearly displaceable. On the one hand, the use of previous components for a guide is possible, and, on the other hand, a linear drive can be employed to move the deflector along the guide.

In order to obtain an ideal effect of the belt tensioner the deflector deflects the tension transmitting means by at least 90°, preferably by at least 120°. The more acute the angle about which the deflector deflects the tension transmitting means, the higher the transmission ratio between the pull-in distance of the belt and the travel of the drive unit so that the pull-in distance of the belt buckle increases with an increasing angle of deflection.

The deflector may include, for instance, a guide, especially a tube, in which the tension transmitting means is supported to be longitudinally displaceable.

In order to couple the deflector to the drive unit preferably a catch upon which the drive unit can act is provided at the deflector. The catch can be configured, for example, such that previous drives, for instance linear drives, can act upon the same so that they can also be employed in the belt tensioner according to the invention.

For instance, it is possible that the drive unit includes a motor-driven spindle. A spindle nut coupled to the deflector is longitudinally displaced via said motor-driven spindle. Such motor-driven spindle may simultaneously serve as linear guide for the deflector so that the number of component parts is reduced. The spindle nut may be formed integrally with the catch, but it can also be a component part formed separately from the catch.

The drive unit can also comprise a piston-cylinder unit, which is coupled, for instance, to a pyrotechnic propellant.

As an alternative, the drive unit can also include a spring biased in the non-activated condition.

Preferably, the deflector divides the tension transmitting means into a linear portion at the drive side, a linear portion at the coupling member side and a bent deflecting portion located there between. In this way, a linear movement of the deflector is transformed into a linear movement of the coupling member. A linear drive can be arranged, for example, in parallel to the linear portion, which permits a space-saving construction.

DESCRIPTION OF THE EXAMPLE EMBODIMENT

Figure 1:
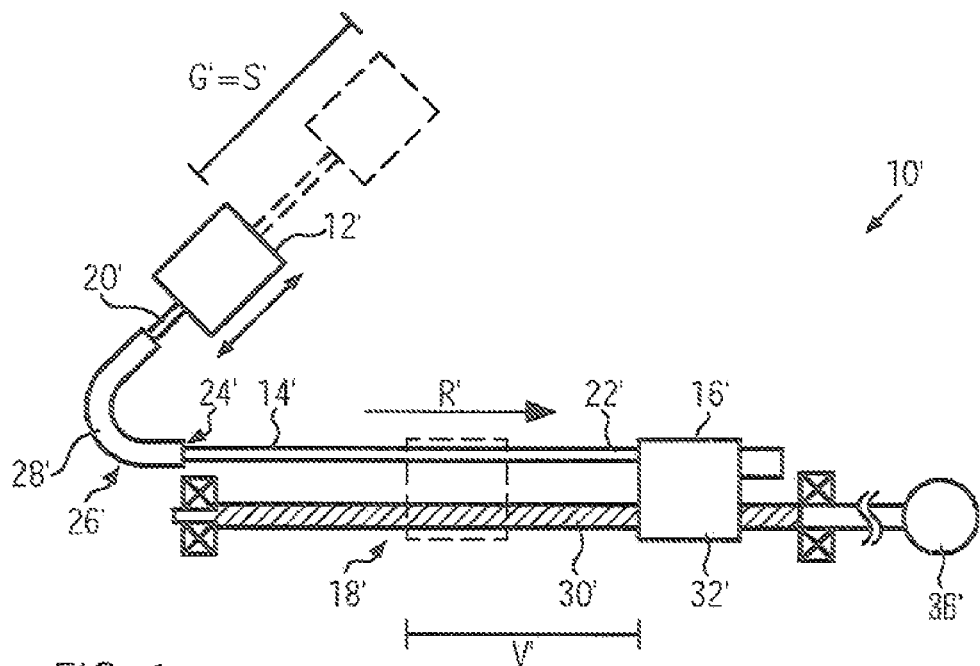
FIG. 1 shows a belt tensioner of the state of the art.

In FIG. 1 a belt tensioner 10' known from the state of the art is shown. The belt tensioner 10' includes a coupling member 12', a belt buckle in this case, to which a vehicle seat belt not shown here can be fastened. The coupling member 12' is held at a flexible tension transmitting means 14' fixed to a catch 16' of a drive unit 18'. The tension transmitting means 14' in this case is a steel cable having a first linear portion 20' connected to the coupling member 12' and a linear mounting portion 22' to which the catch 16' is mounted. The tension transmitting means 14' is deflected in a deflecting portion 24' positioned between the first portion 20' and the mounting portion 22' by a deflector 26' fixed to the vehicle.

The deflector 26' includes a guide 28' in the form of a tube in this case on or in which the tension transmitting means 14' is supported to be longitudinally displaceable and which deflects the tension transmitting means 14' in the direction of the coupling member 12'. Instead of a tube, the deflector 26' can also include a different type of guide 28', for instance a roller on which the tension transmitting means 14' is guided over a U-shaped sheet metal.

The drive unit 18' in this case comprises a motor-driven spindle 30' on which a spindle nut 32' can be longitudinally displaced. The motor-driven spindle 30' can be driven by a motor 36'.

In the event of tensioning, the catch 16' is displaced by the drive unit 18' in an actuating direction R' by a travel V'. Via the tension transmitting means 14' mounted to the catch 16' the coupling member 12' is pulled in the direction of the deflector 26' by a tensioning distance S'. The total displacement G' by which the coupling member 12' is displaced on the whole in this case corresponds to the tensioning distance S' which is equal as to amount to the travel V' of the catch. The ratio between the total displacement G' and the travel V' of the catch 16' and the drive unit 18' thus is always 1:1.

Figure 2:
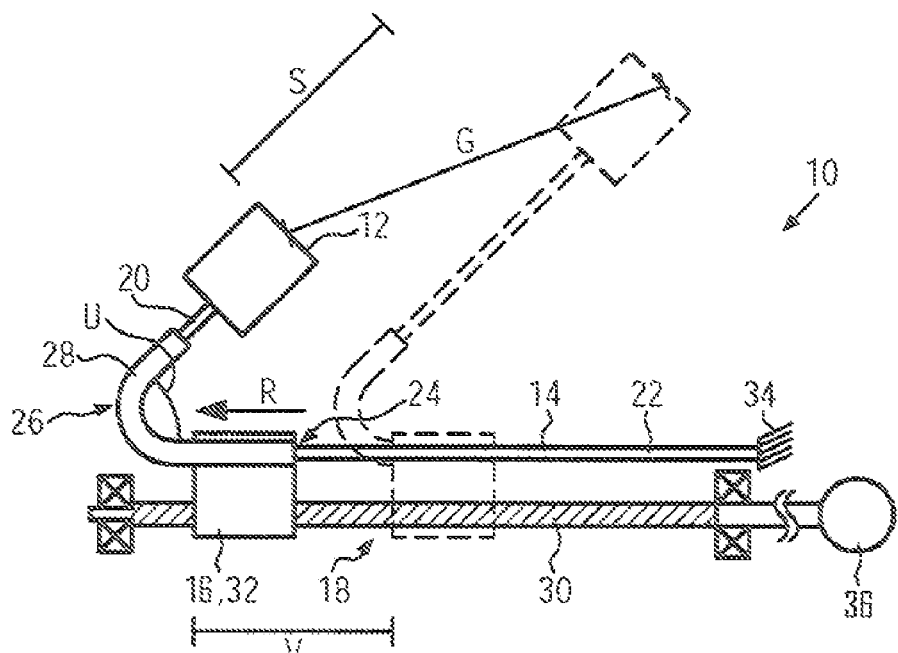
FIG. 2 shows a belt tensioner according to the invention.

Compared to this, in FIG. 2 a belt tensioner 10 according to the invention is represented. The belt tensioner 10 substantially comprises the same components as the belt tensioner 10' shown in FIG. 1 so that the same reference numerals are used for equal components.

In this case, however, the tension transmitting means 14 is mounted by the mounting portion 22 not to the catch 16 or the drive unit 18 but to a component 34 fixed to the vehicle. The catch 16 is attached to the deflector 26 so that the deflector 26 is supported to be linearly displaceable. The drive unit 18 equally acts upon the catch 16 so that the drive unit 18 moves the deflector upon activation of the motor 36.

The tension transmitting means 14 can be divided into three portions, a linear portion at the drive side extending from the mounting portion 22 to the deflector 26, a deflecting portion adjacent to the deflector 26 and a linear portion at the coupling side extending to the coupling member 12.

When tensioning the belt tensioner 10, the drive unit 18 moves the deflector 26 via the catch 16 in the actuating direction R away from the mounting portion 22. The tension transmitting means 14 is moved along the deflector 26 so that the coupling member 12 is pulled, as before, also by the tensioning distance S in the direction of the deflector 26.

In this embodiment, too, the guide 28 can be a tube, a U-shaped or C-shaped guide or a roller having lateral guides or the like.

Here the spindle nut 32 is formed integrally with the catch 16 so that the spindle 30 simultaneously serves as guide for the catch 16.

Instead of a motor-driven spindle 30, also other linear drives are possible, for instance a piston-cylinder unit or a biased spring. The catch need not be guided linearly, either, so that instead of a linear drive a different drive unit 18 can be employed. In particular, a guide arranged separately from the drive unit 18 can be provided for the catch 16.

Since the deflector 26 is displaced along the guide formed by the spindle 30 of the drive unit 18 in the actuating direction R, the belt buckle is in addition moved in parallel to the spindle by the travel V of the catch 16 in the actuating direction R. The total displacement G of the coupling member 12 is thus composed of the pull-in of the tension transmitting means 14 and the coupling member 12 mounted thereto in the direction of the deflector 26, i.e. the tensioning distance S and the displacement of the catch 16 by the travel V in the actuating direction R (cf. also FIG. 3). By the additional displacement of the coupling member 12 the total displacement G is larger in any case than the travel V of the drive unit 18.

Figure 3:
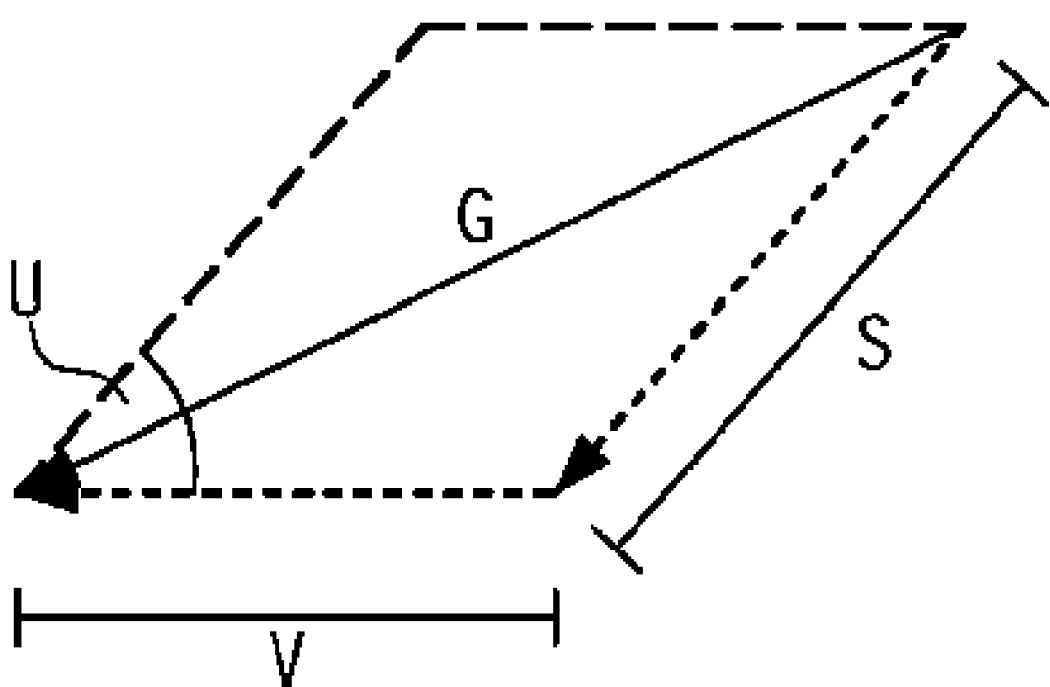
FIG. 3 is a schematic representation of the pull-in distance of the belt tensioner from FIG. 2.

As can be seen especially from FIG. 3, the total displacement G is substantially dependent on the deflecting angle U of the deflector so that the total displacement G of the coupling member 12 can be adapted via the deflector. A deflecting angle of at least 90°, ideally of 120°, turned out to be especially advantageous. In accordance with the formula $$G = V * \sqrt{(1+\cos U)^2 + (\sin U)^2}$$

for instance in the case of an angle of 120° a transmission ratio of 1.73:1 is resulting so that a total displacement is achieved which is by 73% larger than in the state of the art.

The invention claimed is:

1. A belt tensioner (10) of a vehicle occupant restraint system, comprising:
   a coupling member (12) to a vehicle seat belt;
   a drive unit (18);
   a flexible tension transmitting member (14) connected at least indirectly to the coupling member (12), the flexible tension transmitting member (14) being moved via the drive unit (18) in the event of tensioning; and
   a deflector (26) which deflects the tension transmitting member (14) towards the coupling member (12) and the tension transmitting member (14) being moved along the deflector (26) in the event of tensioning,
   the drive unit (18) being coupled to the deflector (26) such that the drive unit (18) moves the deflector (26) in a linear actuating direction (R) extending generally parallel to an axis of the drive unit (18) upon activation and displaces the coupling member (12) in the linear actuating direction (R).

2. A belt tensioner according to claim 1, wherein the tension transmitting member (14) includes a portion (20) connected to the coupling member (12) and a mounting portion (22) fixed to the vehicle.

3. A bet tensioner according to claim 2, wherein the mounting portion (22) of the tension transmitting member (14) is fixed to a component (34) fixed to the vehicle.

4. A belt tensioner according to claim 1, wherein a guide supports the deflector (26) to be linearly displaceable.

5. A belt tensioner according to claim 1, wherein the deflector (26) deflects the tension transmitting member (14) by at least 90°.

6. A belt tensioner according to claim 5, wherein the deflector (28) deflects the tension transmitting member (14) by at least 120°.

7. A belt tensioner according to claim 1, wherein the deflector (26) includes a guide (28), the guide (28) being configured to support the tension transmitting member (14) to be longitudinally displaceable.

8. A belt tensioner according to claim 7, wherein the guide (28) is a tube.

9. A belt tensioner according to claim 1, wherein the drive unit (18) includes a motor-driven spindle (30), a motor (36) and a spindle nut (32) coupled to the defector (26), the spindle nut (32) being longitudinally displaced relative to the motor-driven spindle (30).

10. A belt tensioner according to claim 1, wherein the drive unit (18) comprises a piston-cylinder unit.

11. A belt tensioner according to claim 1, wherein the drive unit (18) includes a spring biased in the non-activated condition.

12. A belt tensioner according to claim 1, wherein the deflector (26) divides the tension transmitting member (14) into a linear portion at a drive side extending in a direction away from the coupling member (12), a linear portion at a coupling side extending in a direction towards the coupling member (12), and a bent deflecting portion (24) located there between.

13. A belt tensioner according to claim 1, wherein the belt tensioner (10) is a belt buckle tensioner.

14. A belt tensioner according to claim 1, wherein the flexible tension transmitting member (14) is a steel cable.

\* \* \* \* \*